Sept. 11, 1962   M. V. YARBOROUGH ETAL   3,053,430
HOLDER FOR PRE-PUNCHED INVENTORY CARDS
Filed Aug. 19, 1960   2 Sheets-Sheet 1
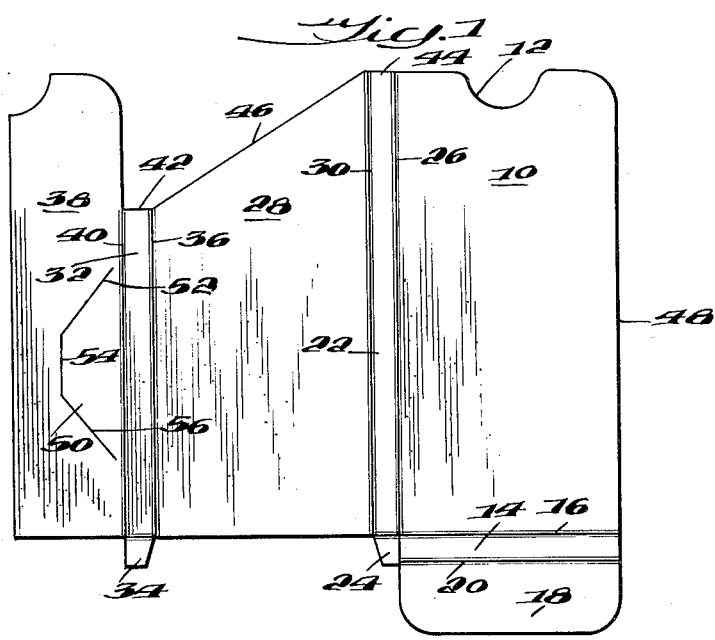
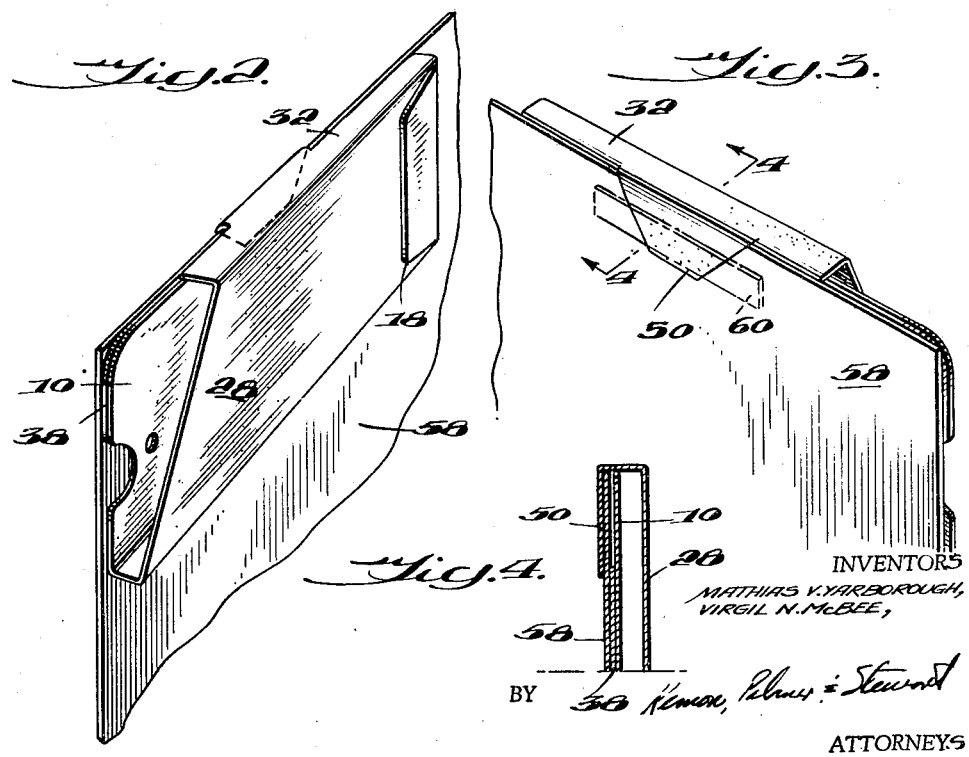
INVENTORS
MATHIAS V. YARBOROUGH,
VIRGIL N. McBEE,
BY
ATTORNEYS

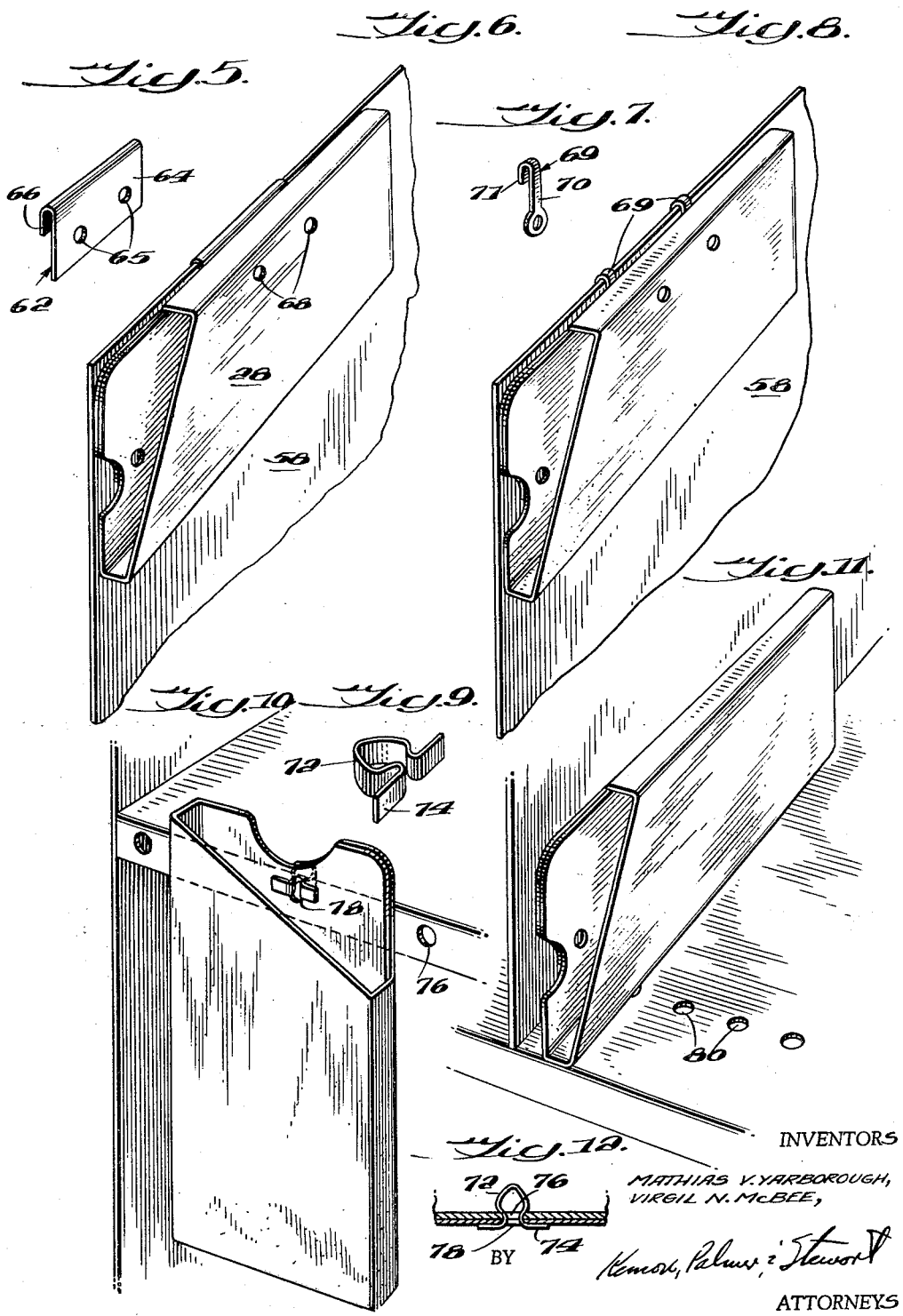

United States Patent Office 3,053,430
Patented Sept. 11, 1962

3,053,430
HOLDER FOR PRE-PUNCHED
INVENTORY CARDS
Mathias V. Yarborough and Virgil N. McBee, Duncan, Okla., assignors to Halliburton Company, Duncan, Okla., a corporation of Delaware
Filed Aug. 19, 1960, Ser. No. 50,608
1 Claim. (Cl. 229—37)

This invention relates to holders for pre-punched inventory cards and more particularly, to a new and unique holder of the type adapted to receive pre-punched inventory cards used in mechanized accounting techniques and mountable on stock parts bins to facilitate keeping a continuous parts inventory.

In recent years and with the development of mechanized accounting procedures wherein pre-punched information storing cards are used, parts manufacturers and suppliers have found it desirable to mount on each parts storage bin a plurality of cards corresponding to the particular part stored so that when a part or parts are removed from the bin, an inventory card is also removed and sent through the appropriate machinery to record removal. In this manner, a continuous parts inventory is kept. Prior to this invention, various types of metallic holders for cards of the type referred to and mountable in storage bins were available on the market but at costs prohibitive to many companies having requirements exceeding for example 100,000 holders. Specifically, at current prices these holders ranged in cost from between 25¢ to $1.25 each. Perhaps some of the principal factors which go to making up such high costs are the prices of sheet metal, the costs involved in fabricating sheet metal, the necessity for painting, the cost of shipping, the relatively heavy metal holders, among others.

Accordingly, a principal object of this invention is to provide a new and unique parts bin mountable holder for pre-punched inventory cards which is highly effective in use and which will cost approximately from 3¢ to 14¢ apiece as compared with 25¢ to $1.25, the cost of such cardholders heretofore available at current prices.

Another object of this invention is the provision of a pre-punched inventory cardholder of the type referred to which is adaptable to virtually all types of parts bins, shelving and racks.

A still further object of this invention is that of providing a cardholder of the type referred to which is extremely easy to manufacture and yet which is of such configuration and proportions to facilitate greatly the insertion and removal of cards to and from the holder.

Other objects and further scope of applicability of the present invention will become apparent from the detailed description given hereinafter. It should be understood, however, that the detailed description, while indicating preferred embodiments of this invention, is given by way of illustration only, since it will be apparent to those skilled in the art after reading this description, that various changes and modifications can be made without departing from the true spirit and scope of this invention.

In general, the foregoing objects are achieved by forming the cardholder from a foldable blank of rigid, non-metallic material such as cardboard, resin impregnated fiber board, plastic or other low cost materials. The blank is folded into an open-ended receptacle having front and rear walls, side walls, and an end wall, the open-ended edge of the front wall being angularly disposed relative to the corresponding end on the rear wall and the side walls of such length to correspond therewith so that manipulation of cards to and from the holder is facilitated. Further, a mounting flap is provided on the blank which in the assembled holder results in a double thickness of material over a portion of the rear wall which portion carries mounting means by which the holder may be affixed to a parts bin.

A more complete understanding of the new and improved inventory cardholders of this invention and their method of use may be had by reference to the accompanying drawings in which:

FIG. 1 is a plan view of the blank from which the cardholder of this invention is made;

FIG. 2 is a perspective view showing a preferred form of the cardholder of this invention mounted on the wall of a parts bin;

FIG. 3 is a perspective view showing the holder illustrated in FIG. 2 from the rear side of the parts bin wall;

FIG. 4 is a partial cross-sectional view taken along lines 4—4 of FIG. 3;

FIG. 5 is a perspective view of an alternative form of mounting device useable with the cardholder of this invention;

FIG. 6 is a perspective view showing the cardholder mounted on a parts bin wall with the mounting device illustrated in FIG. 5;

FIG. 7 is a perspective view of another modification of mounting means useable with the cardholder of this invention;

FIG. 8 is a perspective view of a cardholder equipped with the mounting devices illustrated in FIG. 7;

FIG. 9 is a perspective view of still another modified form of mounting device useable with the cardholder of this invention;

FIG. 10 is a perspective view illustrating the use of the device illustrated in FIG. 9 for mounting the cardholder on a different type of bin;

FIG. 11 shows still another form of bin to which the cardholder of this invention is adapted by use of the mounting device illustrated in FIG. 9; and FIG. 12 is a fragmentary cross-sectional view illustrating further, the mounting device shown in FIG. 9.

Referring now to FIGS. 1 to 4 wherein a preferred form of the invention is illustrated, and particularly to FIG. 1, a blank of rigid non-metallic material from which the cardholder is formed is illustrated. The blank is formed having a rear wall panel 10 generally complementing the size of the cards to be held, having a cutout 12 at its upper end and connected at its lower end to an end wall panel 14 along fold line 16. A tab 18 is connected to the end wall panel 14 along fold line 20. A first side wall panel 22 having a tab 24 at its lower end is connected on one side to the rear wall panel 10 along a fold line 26 and at its other side to a front wall panel 28 along a fold line 30. A second side wall panel 32 is provided having a tab 34 at its lower end and is connected along one edge to the front wall panel 28 along fold line 36 and at its other side to a rear flap panel 38 along a fold line 40. The upper edge 42 of the second side wall panel 32 is at a height substantially less than the upper edge 44 of the first side wall panel 22 as well as the rear wall panel 10. Also, the upper or open-ended edge 46 of the front wall panel 28 is inclined between the fold lines 30 and 36 and the respective heights of the upper edges 42 and 44.

The rear flap panel 38 as shown in FIG. 1 corresponds in size and shape to a portion of the width of the rear wall panel 10. Thus, to achieve the assembled cardholder illustrated in FIG. 2 the free edge 48 of the rear wall panel 10 is placed adjacent to the fold line 40 after right angle folds have been made along the respective foldlines 26, 30, and 36. The flap panel 38, after the appropriate right angle fold is made along fold line 40, is secured by a suitable adhesive to the exterior of the rear wall panel portion beginning with the edge 48 and extending to a width equal to the width of the flap panel 38.

The flap panel 38 is provided with a mounting tab 50 formed by cutting along lines 52, 54, and 56. During the assembly of the blank illustrated in FIG. 1 into tubular form, care is taken to assure that the tab 50 is not also secured to the rear portion of the rear wall panel along with the remainder of the flap panel 38, since it is necessary that the tab 50 be separable from the rear portion 48 as will be understood from the description which follows.

Prior to shipment to the point of use, the blank illustrated in FIG. 1 is assembled as described into a tubular shape by the permanent securement of the flap 38 to the rear wall panel 10 such as by glue or the like but leaving the tab 50 unsecured. Preferably, the blank is not folded at this time along lines 16 and 20 so that the end wall panel 14 and tab 18 remain extending in the plane of the rear wall panel 10. In this manner, it is possible to collapse the now tubular blank for more compact storage during shipment. When the folded tubular blank reaches the point of use, the tab 18 and end wall panel 14 are folded along lines 20 and 16 respectively and the tab 18 affixed to the front wall 28. Preferably the tab 18 carries an adhesive by which it may be glued to the exterior of the front wall 28 though it is contemplated that in some instances this tab may be merely folded behind the front wall 28.

Having thus assembled the cardholder, it may be affixed or mounted to the upper edge of a bin wall 58 as illustrated in FIGS. 2, 3, and 4 by engagement of the tab 50 thereover. If desired, a strip of adhesive tape 60 may be used to fix the tab 50 to the wall 58 in a more secure manner.

Referring now to FIGS. 5 and 6, wherein a modified form of mounting means is illustrated, it will be noted that a metallic clip 62 is provided having a wall portion 64 with apertures 65 formed therein and a doubled back lip portion 66. Apertures 68 may be formed in the front wall 28 of the holder to facilitate attachment of the metallic clip 62 such as by rivets. After the clip has been attached in this manner, it may be mounted to the upper end of the wall 58 in the manner shown.

In the alternative form illustrated in FIGS. 7 and 8 a pair of individual clips having a cross-sectional configuration similar to that of the clip illustrated in FIG. 5 is used. In this instance, the clips 69 are formed having a shank portion 70 and a doubled back lip or hook portion 71. The manner of attaching the clips 69 is the same as attachment of the clip 62 and therefor additional explanation is deemed unnecessary.

A further modification of mounting devices is illustrated in FIG. 9 of the drawings. In this instance, the mounting device is in the form of a resilient clip having a head portion 72 of generally triangular shape and a pair of outwardly extending leg portions 74. This type of mounting device is especially desirable with bins or shelves of the type having apertures 76. Thus, as shown in FIG. 10, an aperture 78 receives the head 72 of the clip illustrated in FIG. 9 which head is also received by the aperture 76 to secure the holder or container to the bin or shelf. The manner of securement is further illustrated in FIG. 12.

FIG. 11 is an illustration of how the cardholder of this invention may be adapted to bins or shelves having apertures in a horizontal aperture 80 in a horizontally positioned panel. In this instance an aperture (not shown) is provided in the side wall 22 and the holder secured in the apertures 80 by use of the clip illustrated in FIG. 9.

Thus it will be seen that by this invention an extremely effective, inexpensive and versatile cardholder for pre-punched cards is provided. Further, it is to be understood that the foregoing description is illustrative only and not limiting and that the true spirit and scope of this invention is to be determined by the appended claim.

We claim:

A parts bin mountable holder for pre-punched inventory cards comprising: an open ended receptacle formed from a foldable blank of rigid non-metallic material including a rear wall panel of generally rectangular shape and corresponding in size to the cards, a front wall panel, a first side wall panel of a height substantially equal to the height of said rear wall panel and inter-connecting said front and rear wall panels along fold lines, a second side wall panel of a height substantially less than said first side wall panel and connected along a fold line to the opposite side of said front wall panel from said first side wall panel, the upper edge of said front wall panel being on an incline between the upper edges of said first and second side wall panels, an end wall panel connected along a fold line to the bottom of said rear wall panel and a rear flap panel attached to said second side wall panel along a fold line, said rear flap panel corresponding in size and shape to a portion of the width of said rear wall panel and being folded over said rear wall panel and secured thereto, and means for mounting said receptacle on a parts bin wall, said mounting means comprising a tab in said rear flap panel.

References Cited in the file of this patent

UNITED STATES PATENTS

| | | |
|---|---|---|
| 655,739 | Runtz | Aug. 14, 1900 |
| 900,751 | Lockwood | Oct. 13, 1908 |
| 1,373,097 | Roda | Mar. 29, 1921 |
| 1,524,170 | Carson | Jan. 27, 1925 |
| 2,182,858 | Thompson | Dec. 12, 1939 |
| 2,632,449 | Lowings | Mar. 24, 1955 |
| 2,816,651 | Burton | Dec. 17, 1957 |

FOREIGN PATENTS

| | | |
|---|---|---|
| 925,406 | Germany | Mar. 21, 1955 |
| 927,988 | Germany | May 23, 1955 |